US012609481B2

(12) United States Patent
Saburi et al.

(10) Patent No.: US 12,609,481 B2
(45) Date of Patent: Apr. 21, 2026

(54) CONNECTOR WITH TERMINAL-ACCOMMODATING HOUSING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Chikara Saburi, Osaka (JP); Yuka Koizumi, Osaka (JP); Keigo Takahashi, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 335 days.

(21) Appl. No.: 18/271,830

(22) PCT Filed: Dec. 24, 2021

(86) PCT No.: PCT/JP2021/048084
§ 371 (c)(1),
(2) Date: Jul. 11, 2023

(87) PCT Pub. No.: WO2022/153832
PCT Pub. Date: Jul. 21, 2022

(65) Prior Publication Data

US 2024/0063570 A1 Feb. 22, 2024

(30) Foreign Application Priority Data

Jan. 14, 2021 (JP) ................................ 2021-003915

(51) Int. Cl.
*H01R 13/514* (2006.01)
*H01R 13/6463* (2011.01)

(52) U.S. Cl.
CPC ....... *H01R 13/514* (2013.01); *H01R 13/6463* (2013.01)

(58) Field of Classification Search
CPC .............. H01R 13/514; H01R 13/4362; H01R 13/6463
See application file for complete search history.

(56) References Cited

U.S. PATENT DOCUMENTS 5,122,077 A 6/1992 Maejima et al.
5,281,161 A * 1/1994 Kanai .................. H01R 12/716 439/701

(Continued)

FOREIGN PATENT DOCUMENTS

JP 2003-223953 A 8/2003
JP 2020-202033 A 12/2020

OTHER PUBLICATIONS

International Search Report issued on Feb. 15, 2022 for WO 2022/153832 A1 (6 pages).

*Primary Examiner* — Oscar C Jimenez
(74) *Attorney, Agent, or Firm* — Venjuris, P.C.

(57) ABSTRACT

It is aimed to reduce a size in an arrangement direction of a plurality of terminal groups. A connector (10) is provided with an inner module (11) including a plurality of terminal groups (22) each having a pair of terminals (60) to be respectively connected to a pair of conductive paths (71), and an outer housing (12) for accommodating the inner module (11). The inner module (11) includes an inner housing (21) integrally configured to support the plurality of (Continued)

terminal groups (22). The outer housing (12) includes one accommodation chamber (84) for accommodating the inner module (11).

10 Claims, 16 Drawing Sheets

(56) References Cited

U.S. PATENT DOCUMENTS

| | | | | |
|---|---|---|---|---|
| 6,036,550 | A * | 3/2000 | Naganawa | H01R 13/514<br>439/701 |
| 8,992,257 | B2 * | 3/2015 | Ii | H01R 13/59<br>439/607.41 |
| 11,088,486 | B2 * | 8/2021 | Maesoba | H01R 13/6581 |
| 2013/0023154 | A1 | 1/2013 | Ii | |
| 2015/0132994 | A1 | 5/2015 | Zebhauser et al. | |
| 2019/0006785 | A1 | 1/2019 | Maesoba et al. | |
| 2020/0083633 | A1 | 3/2020 | Maesoba et al. | |
| 2020/0274278 | A1 | 8/2020 | Kameyama et al. | |
| 2021/0083433 | A1 | 3/2021 | Ikehara | |
| 2021/0281032 | A1 * | 9/2021 | Miyamura | H01R 13/436 |
| 2022/0224041 | A1 | 7/2022 | Karita | |
| 2022/0302618 | A1 | 9/2022 | Yamamura et al. | |

* cited by examiner

CONNECTOR WITH TERMINAL-ACCOMMODATING HOUSING

CROSS REFERENCE TO RELATED APPLICATIONS

This application is a national phase of PCT application No. PCT/JP2021/048084, filed on 24 Dec. 2021, which claims priority from Japanese patent application No. 2021-003915, filed on 14 Jan. 2021, all of which are incorporated herein by reference.

TECHNICAL FIELD

The present disclosure relates to a connector.

BACKGROUND

A connector disclosed in Patent Document 1 includes a terminal unit formed such that an inner conductor is accommodated in a dielectric and a housing having an accommodation chamber, into which the terminal unit is inserted. In the case of accommodating a plurality of terminal units in the housing, the configuration of a connector disclosed in Patent Document 2 is, for example, considered. The connector of Patent Document 2 is provided with a housing and a plurality of contact elements to be inserted into the housing. The contact elements are crimped and connected to two cores of a twisted pair cable. The plurality of contact elements are arranged side by side in two upper and lower stages in the housing. A partition wall partitioning a space for accommodating the contact elements in an arrangement direction is provided in the respective stages in the housing.

PRIOR ART DOCUMENT

Patent Document

Patent Document 1: JP 2018-152215 A
Patent Document 2: JP 2015-528625 A

SUMMARY OF THE INVENTION

Problems to be Solved

In a configuration provided with a partition wall partitioning an accommodation chamber in an arrangement direction of a plurality of contact elements (terminal fittings) as in the connector of Patent Document 2, a size in the arrangement direction of the contact elements (terminal fittings) increases. Accordingly, a technique capable of reducing a size in an arrangement direction of contact elements (terminal fittings) is required in a configuration for accommodating the plurality of contact elements (terminal fittings).

A connector of the present disclosure was completed on the basis of the above situation and can reduce a size in an arrangement direction of a plurality of terminal groups.

Means to Solve the Problem

The present disclosure is directed to a connector with an inner module including a plurality of terminal groups each having a pair of terminals to be respectively connected to a pair of conductive paths, and an outer housing for accommodating the inner module, the inner module including an inner housing integrally configured to support the plurality of terminal groups, and the outer housing including one accommodation chamber for accommodating the inner module.

Effect of the Invention

According to the present disclosure, it is possible to reduce a size in an arrangement direction of a plurality of terminal groups.

DETAILED DESCRIPTION TO EXECUTE THE INVENTION

Description of Embodiments of Present Disclosure

Figure 1:
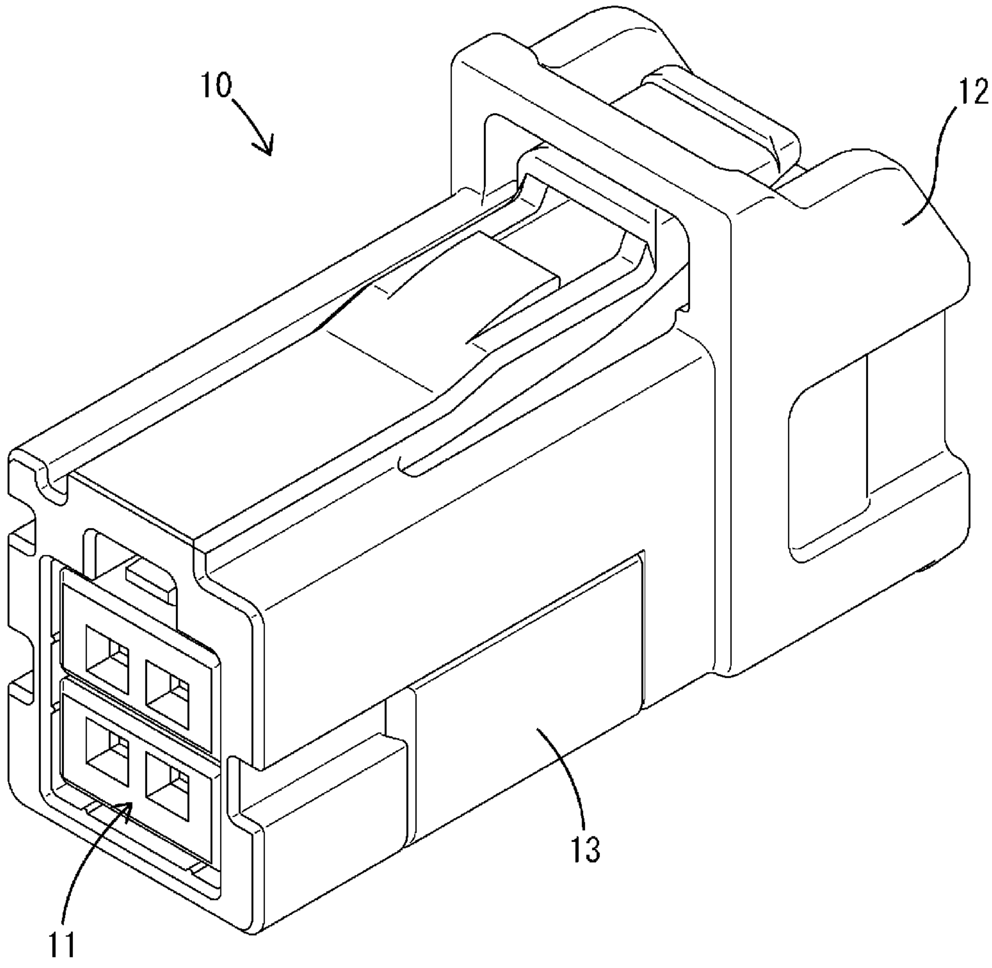
FIG. 1 is a perspective view of a connector.

First, embodiments of the present disclosure are listed and described.

(1) The connector of the present disclosure is provided with an inner module including a plurality of terminal groups each having a pair of terminals to be respectively connected to a pair of conductive paths, and an outer housing for accommodating the inner module, the inner module including an inner housing integrally configured to support the plurality of terminal groups, and the outer housing including one accommodation chamber for accommodating the inner module.

According to the configuration of the present disclosure, since the outer housing is configured to accommodate the inner module including the plurality of terminal groups in one accommodation chamber, it is not necessary to provide a partition wall (wall partitioning in an arrangement direction of the plurality of terminal groups) a space in the accommodation chamber to separately accommodate each of the plurality of terminal groups. Thus, a size of the connector in the arrangement direction of the plurality of terminal groups can be reduced.

(2) Preferably, the pair of terminals are connected to a twisted pair cable formed by twisting the pair of conductive paths, and the inner housing includes a plurality of first supporting portions having slit-like openings for accommodating the terminals and a second supporting portion for supporting the first supporting portions to close the openings. According to this configuration, in the connector, the terminals can be accommodated in a posture parallel to the slit-like openings. Thus, in the connector, the untwisting of the twisted pair cable can be shortened in length as compared to a configuration in which each of the pair of terminals is inserted in such a posture as to be pierced into the inner housing.

(3) Preferably, the plurality of first supporting portions have the same shape. According to this configuration, the number of types of constituent components of the connector can be reduced.

(4) Preferably, the second supporting portion includes a plate portion for closing the openings by being sandwiched by a pair of the first supporting portions. According to this configuration, the openings of the pair of first supporting portions can be respectively closed by one second supporting portion. A size of the connector in a plate thickness direction of the plate portion (arrangement direction of the terminal groups) can be reduced as compared to a configuration in which each of the openings of the pair of first supporting portions is closed by a separate member.

(5) Preferably, the outer housing includes a groove portion extending along an inserting direction of the inner module, the inner housing includes a rib to be inserted into the groove portion, the rib enters the groove portion when the inner module is inserted in a proper posture into the outer housing and the rib interferes with the outer housing when the inner module is inserted in a posture different from the proper posture into the outer housing. According to this configuration, when the inner module is inserted in a posture different from the proper posture into the outer housing, the rib interferes with the outer housing, wherefore erroneous insertion of the inner module can be detected.

(6) Preferably, a cable is configured by surrounding the pair of conductive paths by a sheath, the cable includes a projecting portion projecting further outwardly of the inner module than the terminals, and an opening for exposing the projecting portion is provided in an outer surface of the inner housing. According to this configuration, since the projecting portion is exposed from the opening, a size of the inner module can be reduced by as much as the cable enters the opening as compared to a configuration in which the opening is not provided.

(7) Preferably, a width of the opening in a direction orthogonal to an axial direction of the sheath is smaller than a diameter of the sheath. According to this configuration, the sheath can be prevented from coming out from the opening.

(8) Preferably, a tapered portion expanding toward the cable is provided on an inner surface of an opening edge of the opening. According to this configuration, the outer surface of the sheath can be brought closer to the opening and the size of the inner module can be reduced as compared to a configuration in which the tapered portion is not provided.

(9) Preferably, the outer housing includes a protrusion projecting inside the accommodation chamber and to be brought into contact with the projecting portion exposed from the opening. According to this configuration, the connector can suppress the rattling of the cable.

DETAILS OF EMBODIMENT OF PRESENT DISCLOSURE

Embodiment

Hereinafter, one specific embodiment of a connector of the present disclosure is described with reference to FIGS. 1 to 17. In this embodiment, upper and lower sides shown in FIGS. 1 to 16 are directly defined as upper and lower sides concerning a vertical direction. Left and right sides shown in FIGS. 1 to 4, 6 to 11, 13, 15 and 16 are respectively defined as front and rear sides concerning a front-rear direction. Frontal and back sides shown in FIGS. 1 to 4, 6 to 11, 13, 15 and 16 are respectively defined as left and right sides concerning lateral direction.

(Configuration of Connector)

Figure 2:
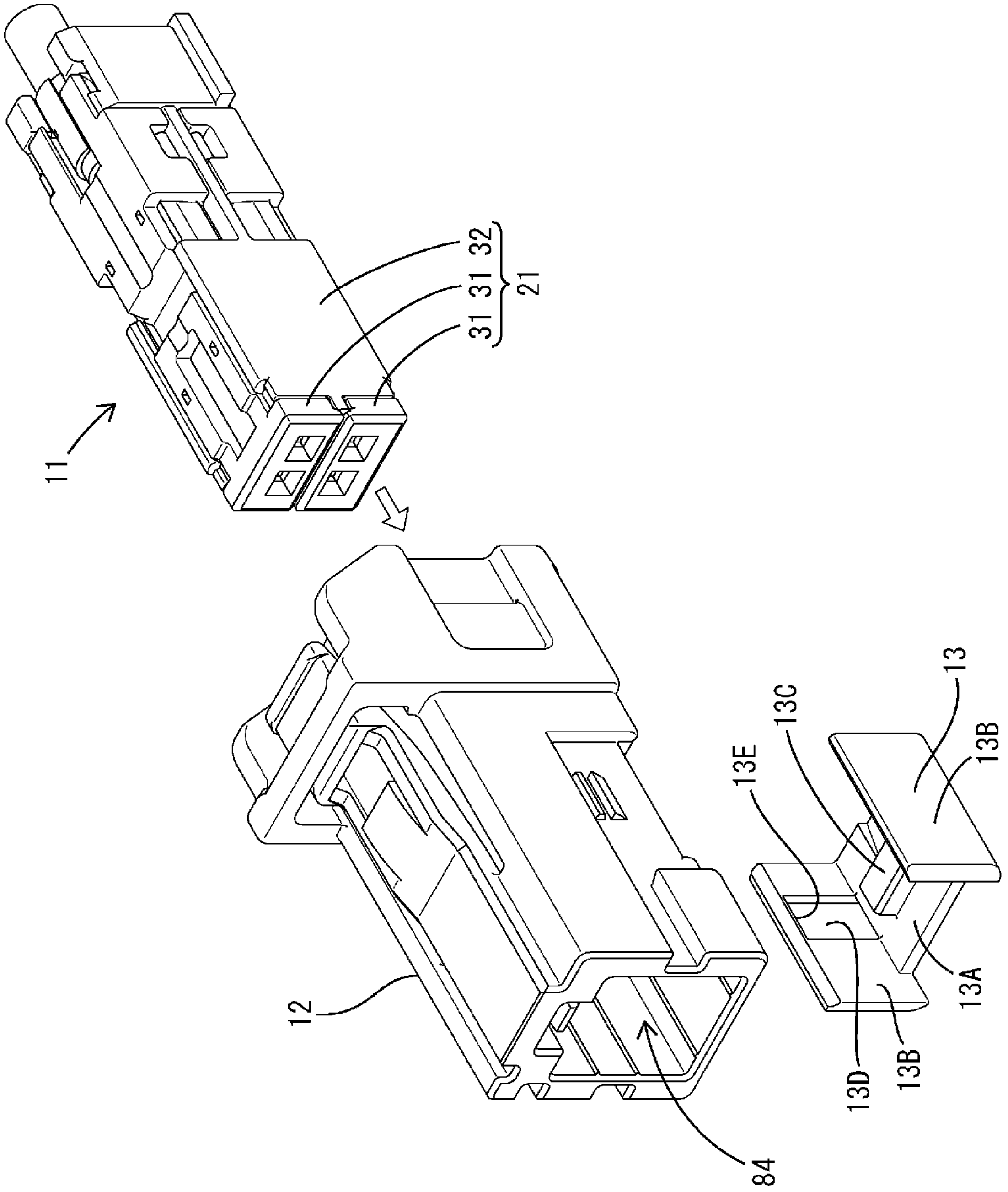
FIG. 2 is a perspective view of an outer housing, an inner module and a retainer.
Figure 3:
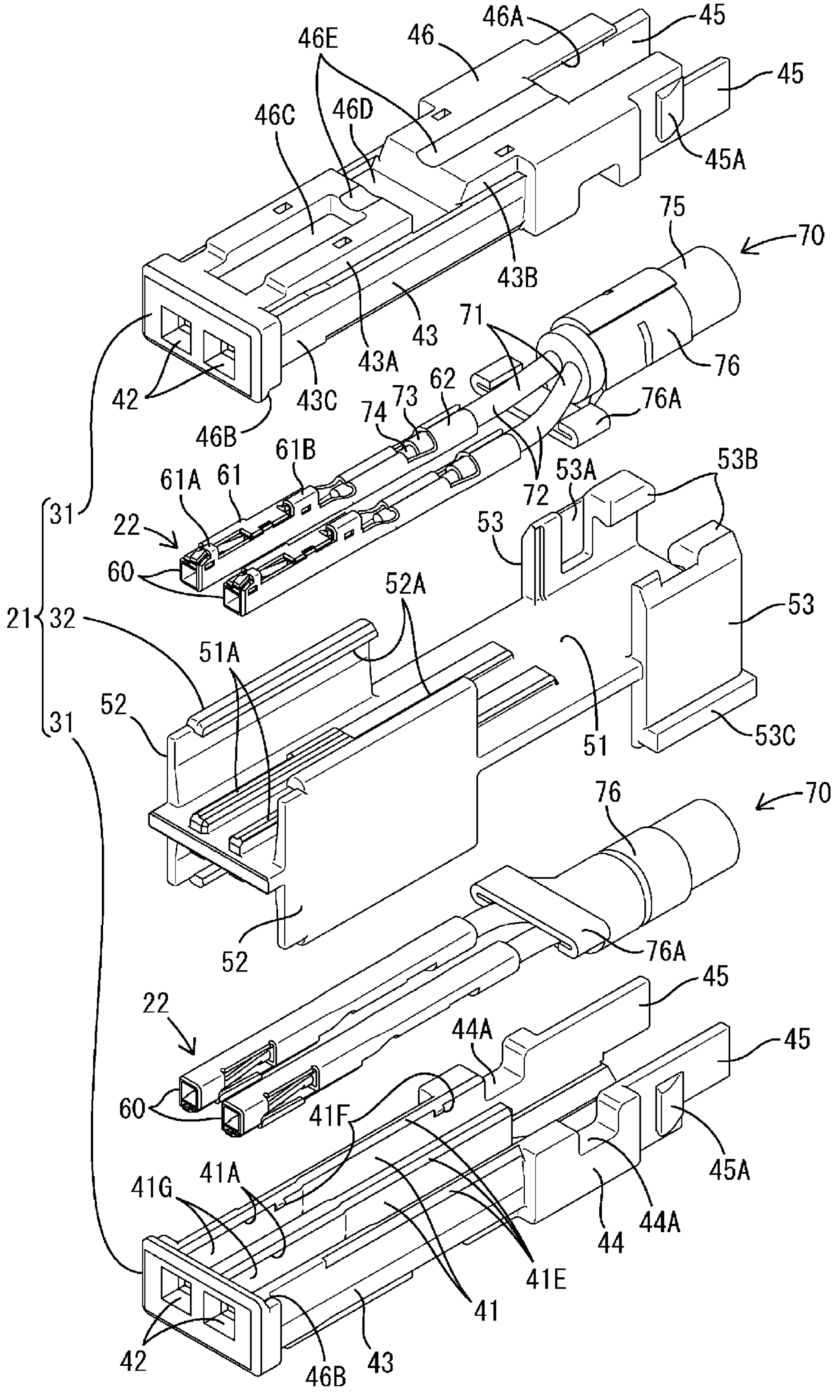
FIG. 3 is an exploded perspective view of the inner module.

A connector 10 of this embodiment shown in FIG. 1 is, for example, configured as a branch connector to be connected at an intermediate position of a trunk harness. As shown in FIG. 2, the connector 10 is provided with an inner module 11, an outer housing 12 and a retainer 13. The inner module 11 is accommodated into the outer housing 12. As shown in FIG. 3, the inner module 11 includes an inner housing 21 and a pair of terminal groups 22. The number of the terminal groups 22 is equal to that of electrically conductive path systems constituting the trunk harness.

As shown in FIGS. 2 and 3, the inner housing 21 is integrally configured by assembling a pair of first supporting portions 31 and a second supporting portion 32. The first and second supporting portions 31, 32 are, for example, components made of an insulating material such as synthetic resin. The inner housing 21 supports the pair of terminal groups 22 and is integrally configured as the inner module 11 together with the pair of terminal groups 22.

As shown in FIG. 3, the pair of first supporting portions 31 have the same shape. The first supporting portion 31 is in the form of a box long in the front-rear direction and open in a part on one end side in the vertical direction. The first supporting portion 31 is formed with two terminal accommodation grooves 41 long in the front-rear direction and aligned in the lateral direction. The two terminal accommodation grooves 41 are both open on the one end side in the vertical direction. In the lower first supporting portion 31 shown in FIG. 3, the terminal accommodation grooves 41 are formed by recessing the upper surface of the first supporting portion 31 downward. In the upper first supporting portion 31 shown in FIG. 3, the terminal accommodation grooves 41 are formed by recessing the lower surface of the first supporting portion 31 upward. The terminal accommodation groove 41 includes an opening (opening edge) 41A for accommodating a terminal 60. The opening 41A of the terminal accommodation groove 41 is in the form of a slit elongated in the front-rear direction. The second supporting portion 32 is sandwiched by the pair of first supporting portions 31 to close the openings 41A of the terminal accommodation grooves 41 by the second supporting portions 32 to be described later.

Figure 11:
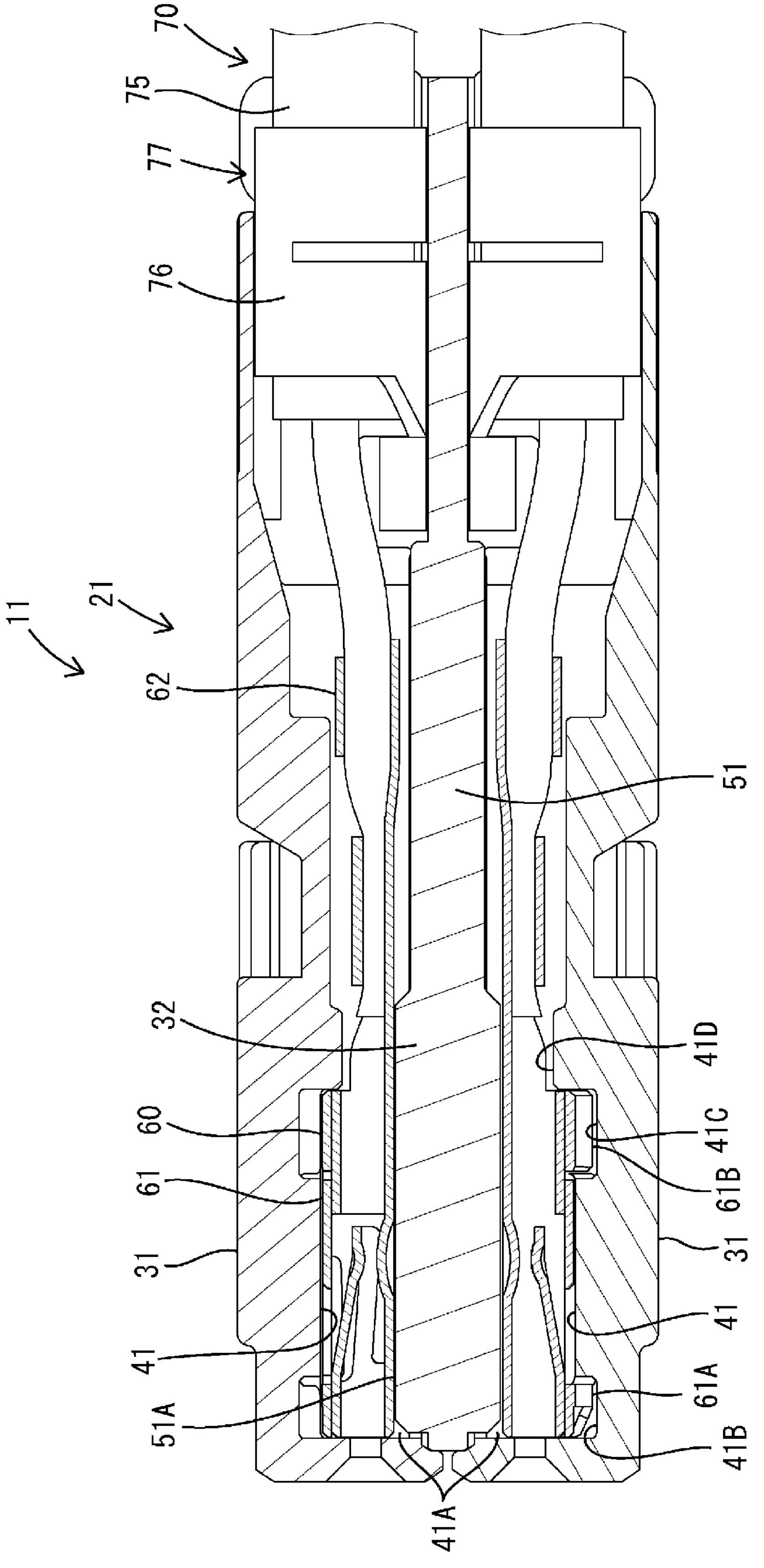
FIG. 11 is a section showing a cross-section of the inner module orthogonal to a lateral direction.

As shown in FIG. 11, a front retaining recess 41B is formed in a front end part of the terminal accommodation groove 41. A rear retaining recess 41C is formed at a position behind the front retaining recess 41B in the terminal accommodation groove 41. A retaining protrusion 41D is formed at a position behind and adjacent to the rear retaining recess 41C.

As shown in FIG. 3, inclined portions 41E narrowed toward an outer side (toward the other first supporting portion) are provided in wall portions (wall portions extending in the vertical direction) constituting the terminal accommodation groove 41 except at front end sides. A pair of claw portions 41F are provided on outer wall portion in the lateral direction of the terminal accommodation groove 41. The claw portions 41F are provided at a position slightly behind the front end of the terminal accommodation groove 41 and at a rear end position of the terminal accommodation groove 41. A narrow portion 41G narrower than a part on a rear end side is provided in the front end of the terminal accommodation groove 41. The front wall of the first supporting portion 31 is formed with two insertion openings 42 individually penetrating from the front end surface to the two terminal accommodation grooves 41.

As shown in FIG. 3, recesses 43 recessed inward in the lateral direction (toward the terminal accommodation groove 41) are provided in left and right wall portions of the first supporting portion 31. The recesses 43 are provided at positions overlapping the terminal accommodation grooves 41 in the lateral direction. An end groove 43A, 43B (see the upper first supporting portion 31) recessed inward in the lateral direction (toward the terminal accommodation groove 41) is provided at one end (end opposite to the other first supporting portion 31) in the vertical direction of the recess 43. The recess 43 is provided with a wide portion 43C (see the upper first supporting portion 31) having a larger width in the vertical direction on a front end side. A rear end side of the wide portion 43C is gradually widened in the vertical direction toward the front.

As shown in FIG. 3, the left and right wall portions of the first supporting portion 31 are provided with thick portions 44 thicker than parts on the front end side (parts overlapping the terminal accommodation grooves 41 in the lateral direction). A recessed portion 44A is provided on one end side (side of the other first supporting portion 31) in the vertical direction of the thick portion 44. The recessed portion 44A is formed by recessing one surface (surface on the side of the other first supporting portion 31) in the vertical direction of the thick portion 44 toward the other surface side (side opposite to the other first supporting portion 31).

As shown in FIG. 3, extending walls 45 extending rearward from the respective left and right wall portions are provided at the rear end of the first supporting portion 31. A positioning protrusion 45A is provided on the outer surface (surface opposite to the other extending wall 45) in the lateral direction of the extending wall 45. The front surface of the positioning protrusion 45A is inclined to approach the extending wall 45 toward the rear. The rear surface of the positioning protrusion 45A is more gently inclined than the front surface.

As shown in FIG. 3, an opening 46A is provided at the rear end of a bottom wall portion 46 (wall portion opposite to the other first supporting portion 31) of the first supporting portion 31. The opening 46A penetrates through the bottom wall portion 46 in the vertical direction. The opening 46A has a rectangular shape when viewed from the vertical direction. The rear end of the opening 46 is open rearward. The rear end of the opening 46A is provided at a position overlapping the front ends of the extending walls 45 in a direction orthogonal to the front-rear direction. The opening 46A exposes a projecting portion 77 of a cable 70 to be described later.

As shown in FIG. 3, a front recess 46B recessed forward is provided on one end (end on the side of the other first supporting portion 31) in the vertical direction of the front wall of the first supporting portion 31. A first outer recess 46C long in the front-rear direction is provided at a position behind and adjacent to the front end in the bottom surface (surface opposite to the other first supporting portion 31) of the first supporting portion 31. In the bottom surface (surface opposite to the other first supporting portion 31) of the first supporting portion 31, a second outer recess 46D is provided which is recessed entirely in the lateral direction on a rear side spaced apart from the first outer recess 46C. The second outer recess 46D is long in the lateral direction. In the bottom surface (surface opposite to the other first supporting portion 31) of the first supporting portion 31, arcuately recessed long grooves 46E are provided at both sides of the second outer recess 46D in the front-rear direction.

The second supporting portion 32 supports the first supporting portions 31 to close the openings 41A of the terminal accommodation grooves 41. As shown in FIG. 3, the second supporting portion 32 is composed of a single component vertically symmetrically shaped except ribs 53C to be described later. The second supporting portion 32 is provided with a plate portion 51, a pair of front side walls 52 and a pair of rear side walls 53. The plate portion 51 is in the form of a rectangular plate long in the front-rear direction. The plate portion 51 closes the terminal accommodation grooves 41. The plate portion 51 closes the openings 41A of the both terminal accommodation grooves 41 by being sandwiched by the pair of first supporting portions 31. A pair of projections 51A long in the front-rear direction are provided on each of both plate surfaces of the plate portion 51. The projections 51A are provided at positions corresponding to the terminal accommodation grooves 41 of the first supporting portion 31. The pair of front side walls 52 extend in the vertical direction from front end side parts of the plate portion 51. The pair of rear side walls 53 extend in the vertical direction from rear end side parts of the plate portion 51. The front and rear side walls 52, 53 are orthogonal to the plate portion 51. The front end of the plate portion 51 projects further forward than the front and rear side walls 52, 53.

As shown in FIG. 3, front locking portions 52A projecting toward the other front side wall 52 are provided in parts of upper and lower ends of the front side wall 52 except front ends. Rear groove portions 53A are provided on both sides of the plate portion 51 on front end sides of the inner surfaces (surfaces facing the other rear side walls 53) of the rear side walls 53. The rear groove portion 53A is recessed toward an outer surface side (side opposite to the other rear side wall 53). The front end of the rear groove portion 53A is inclined to approach the other rear side wall 53 toward the rear. A rear locking portion 53B projecting toward the other rear side wall 53 is provided at a position behind and adjacent to the rear groove portion 53A.

Figure 10:
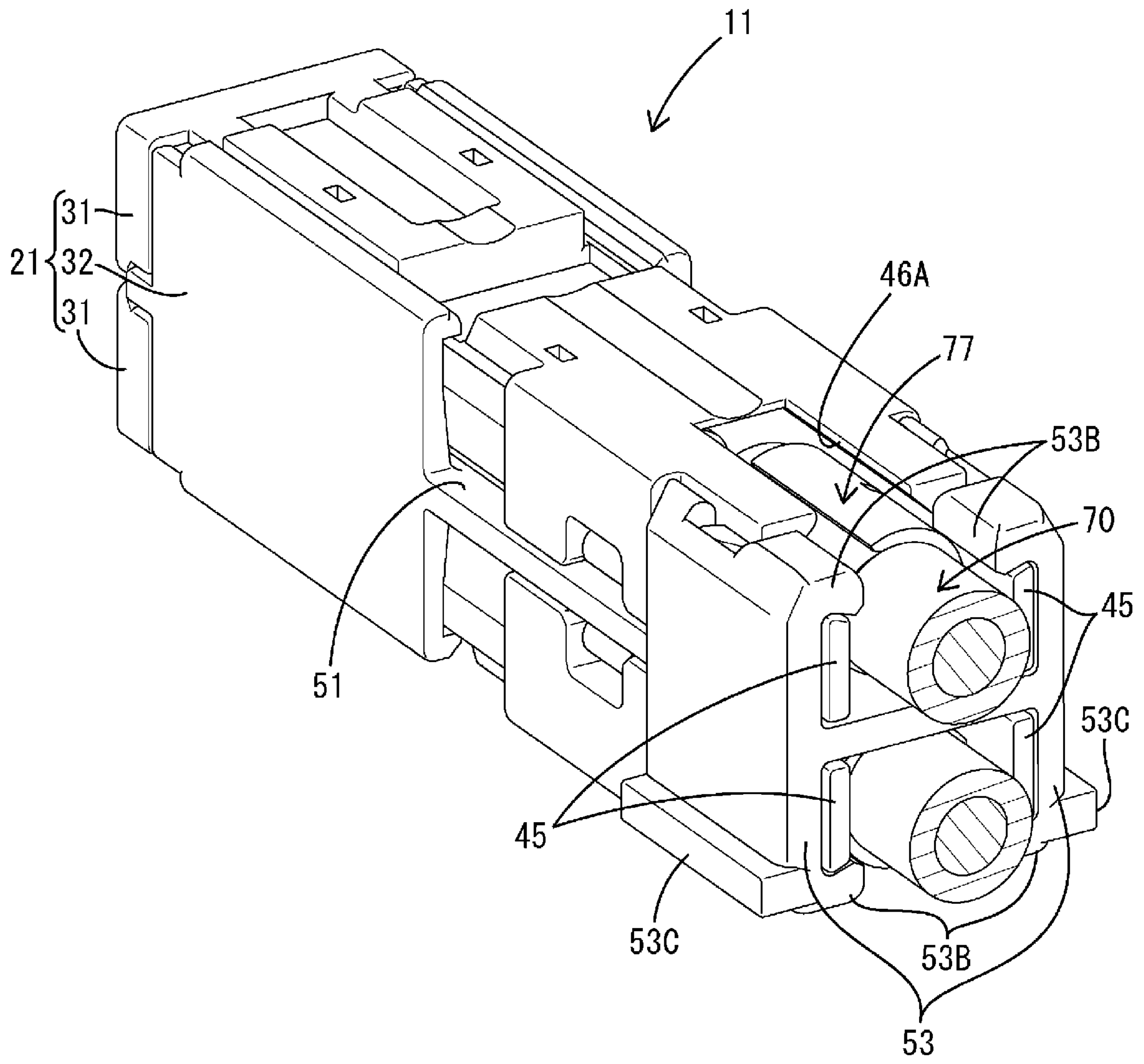
FIG. 10 is a perspective view of the inner module viewed from a back side.

As shown in FIG. 10, the ribs 53C extending in the front-rear direction are provided on the outer surfaces (surfaces opposite to the other rear side walls 53) of the both rear side walls 53. Only the rib 53C of the right rear side wall 53 is shown in FIG. 3. The rib 53C has a rectangular cross-section when viewed from the front-rear direction. When the inner module 11 is inserted in a proper posture into the outer housing 12, the ribs 53C enter groove portions 84A of the outer housing 12 to be described later.

As shown in FIG. 11, the pair of first supporting portions 31 sandwich the second supporting portion 32 to close the openings 41A of the terminal accommodation grooves 41 by the plate portion 51 of the second supporting portion 32. The openings 41A of the pair of first supporting portions 31 can be respectively closed by one second supporting portion 32. The upper first supporting portion 31 is supported in the second supporting portion 32 in a posture vertically inverted from that of the lower first supporting portion 31.

As shown in FIG. 3, the terminal group 22 includes a pair of the terminals 60. The terminal 60 has a shape elongated in the front-rear direction as a whole. A rectangular tube portion 61 is formed in a front end part of the terminal 60, and a crimping portion 62 in the form of an open barrel is formed in a rear end part of the terminal 60. The crimping portion 62 is conductively fixed to a divided portion 72 of a conductive path 71 by crimping. Although not shown, a pair of the conductive paths 71 are twisted and configured as a twisted pair cable. A front stabilizer 61A projecting in a direction orthogonal to the front-rear direction is formed in a front end part of the rectangular tube portion 61. A rear stabilizer 61B projecting in the direction orthogonal to the front-rear direction is formed in a rear end part of the rectangular tube portion 61.

As shown in FIG. 3, the crimping portion 62 is conductively fixed to the divided portion 72 of the conductive path 71. A branched part in each conductive path 71 is the divided portion 72 where each conductive path 71 is divided. In the divided portion 72, a conductor 74 is exposed by removing an insulation coating 73. A pair of the conductors 74 covered by the insulation coatings 73 are collectively surrounded by a sheath 75, whereby the cable 70 is configured. The cable 70 includes a crimp ring 76 mounted on an end part of the sheath 75. The crimp ring 76 includes a covering portion 76A for covering parts of the divided portions 72 from one side (side of the other terminal group 22). The covering portion 76A projects further outward in the lateral direction than the divided portions 72. The terminals 60 fixed to the conductive paths 71 linearly extend from the divided portions 72 of the conductive paths 71.

As shown in FIG. 11, the terminals 60 are accommodated in the terminal accommodation grooves 41 of the first supporting portion 31. The upper terminal 60 is supported in the inner housing 21 in a posture vertically inverted from that of the lower terminal 20.

As shown in FIG. 11, the cable 70 includes the projecting portion 77 projecting further outwardly (outwardly in the vertical direction) of the inner module 11 than the terminals 60. The projecting portion 77 of the upper cable 70 is constituted by the upper end of the sheath 75 and the upper end of the crimp ring 76. The projecting portion 77 of the upper cable 70 projects further upward than the terminals 60. The projecting portion 77 of the lower cable 70 is constituted by the lower end of the sheath 75 and the lower end of the crimp ring 76. The projecting portion 77 of the lower cable 70 projects further downward than the terminals 60. The projecting portions 77 are exposed to outside from the openings 46A of the first supporting portions 31.

Figure 12:
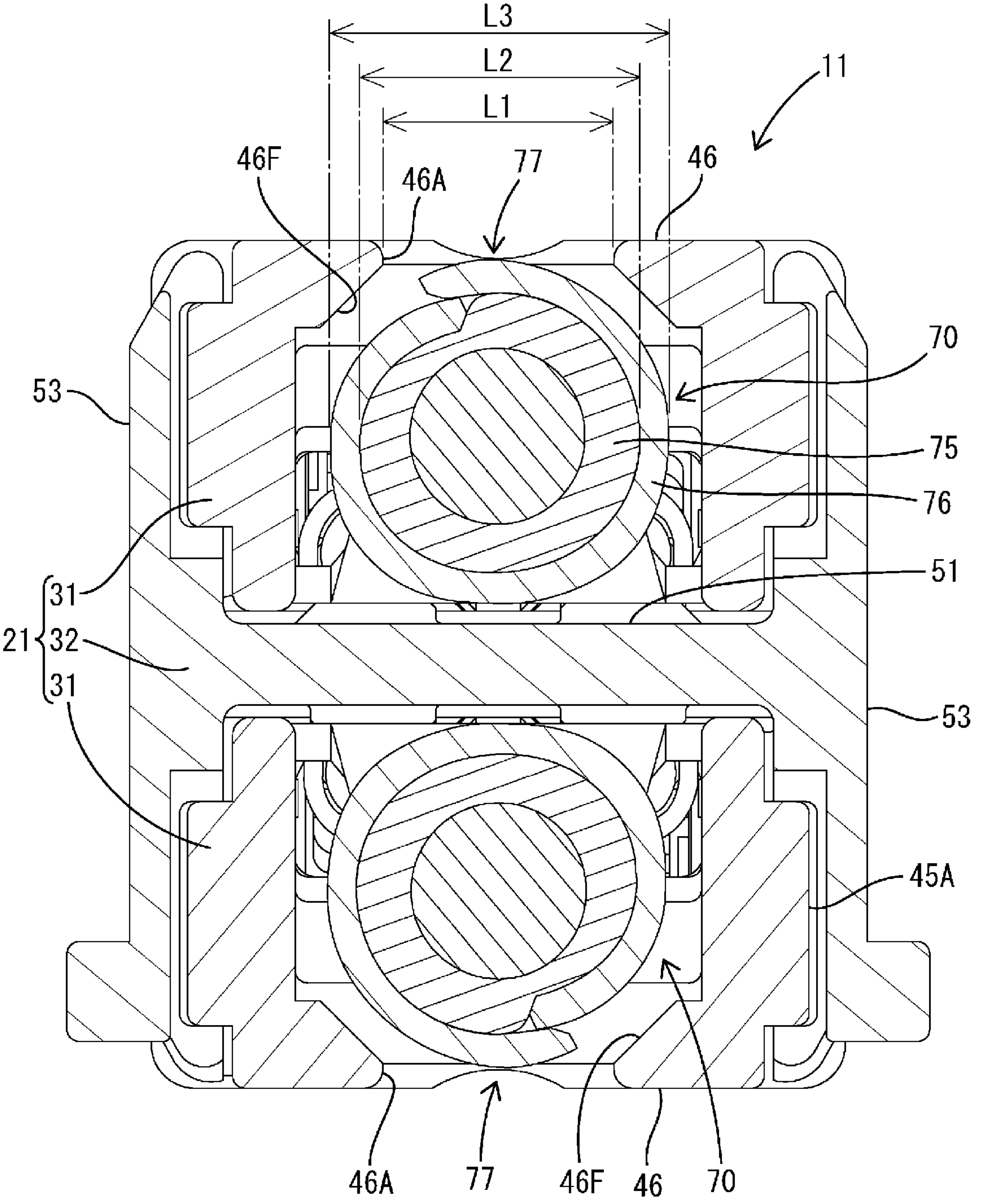
FIG. 12 is a section showing a cross-section of the inner module orthogonal to a front-rear direction.

As shown in FIG. 12, a width L1 of the opening 46A in a direction (lateral direction) orthogonal to an axial direction (front-rear direction) of the sheath 75 is smaller than a width (diameter (outer diameter)) L2 in the lateral direction of the sheath 75. The width L1 of the opening 46A is smaller than a width (diameter (outer diameter)) L3 in the lateral direction of the crimp ring 76. The width L1 of the opening 46A is preferably 60% to 80% of the width (diameter (outer diameter)) L3 in the lateral direction of the crimp ring 76. A tapered portion 46F expanding toward the cable 70 is provided on the inner surface of the opening edge of the opening 46A. The projecting portion 77 of the cable 70 enters the tapered portion 46F.

Figure 4:
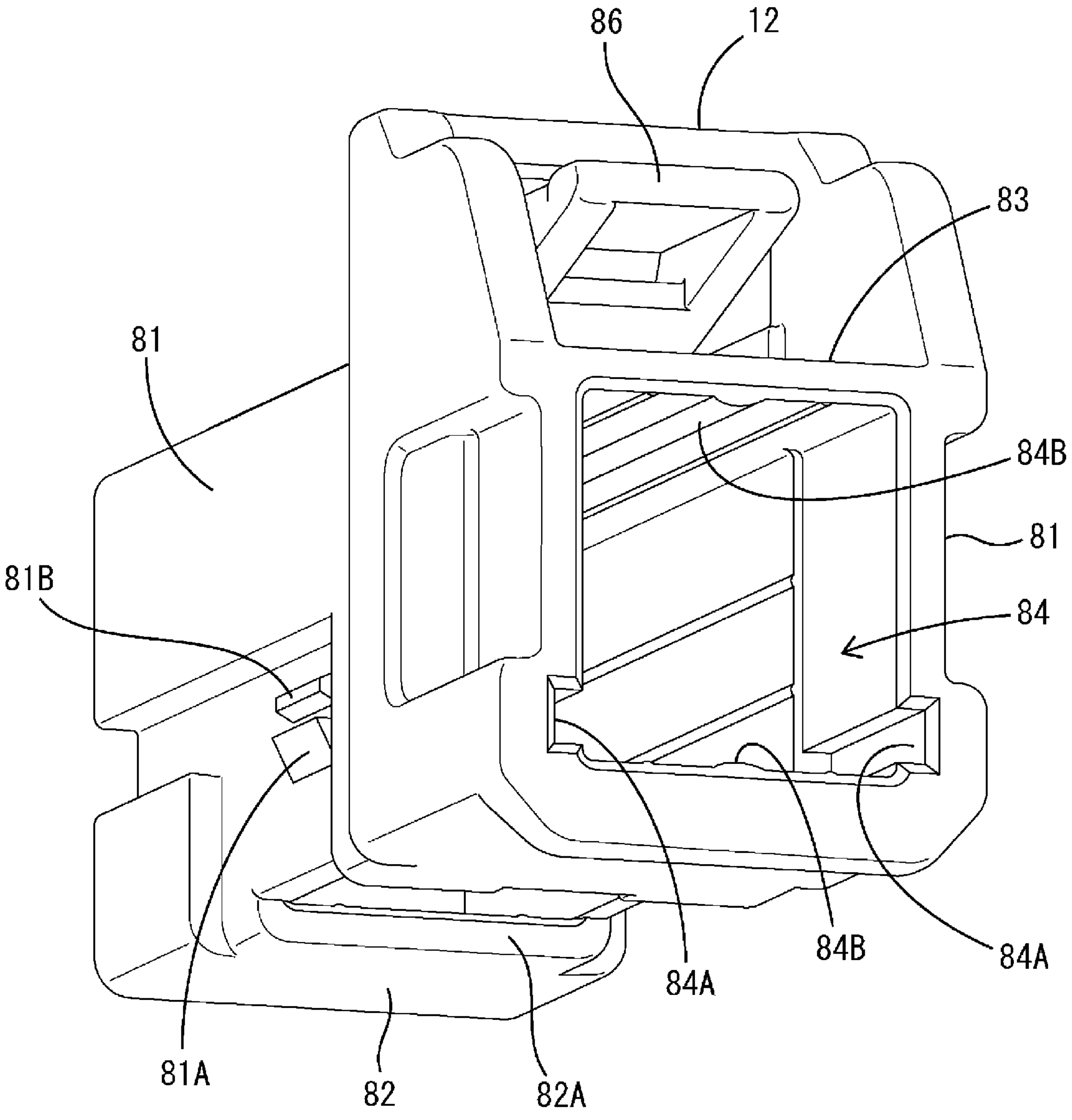
FIG. 4 is a perspective view of the outer housing.
Figure 5:
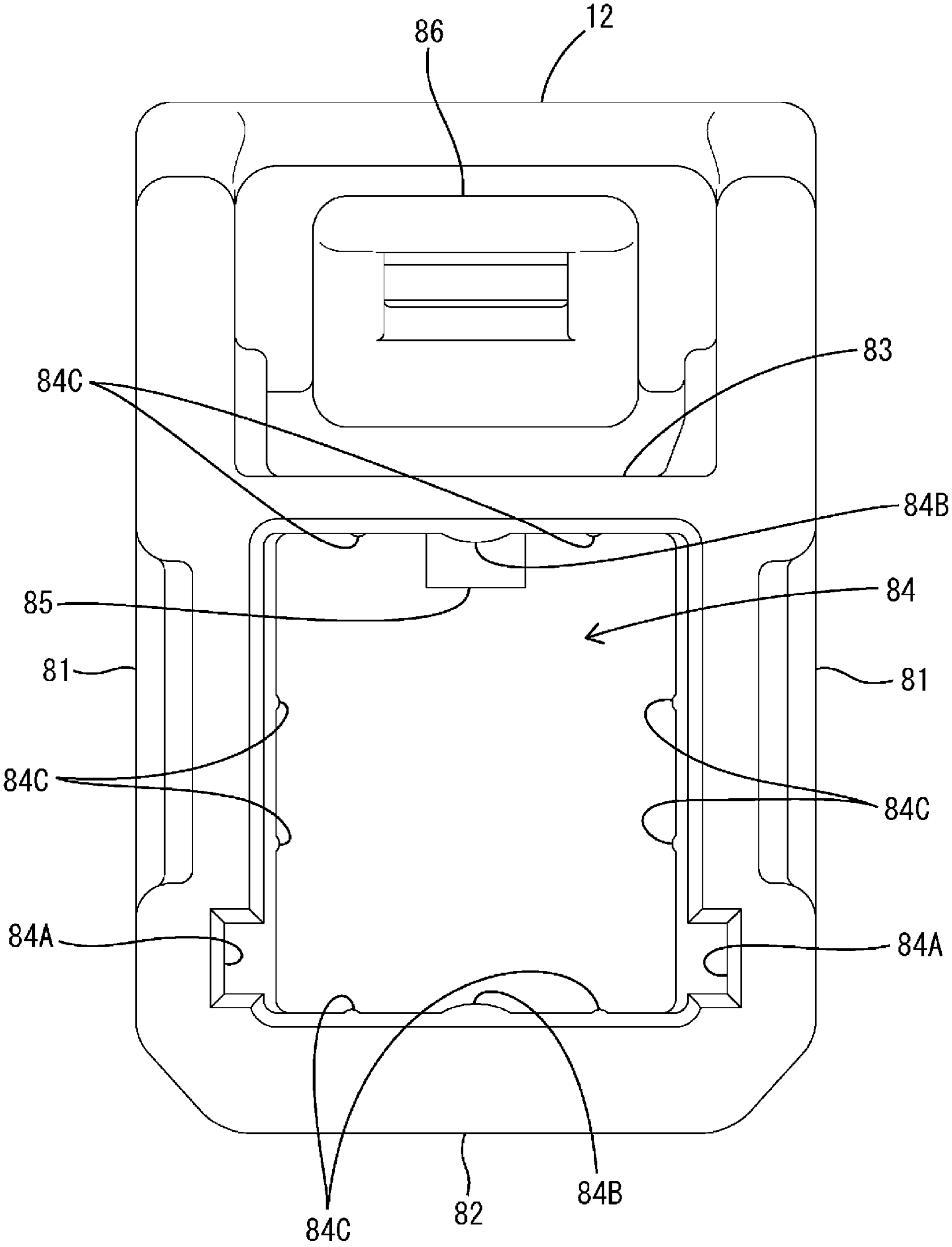
FIG. 5 is a back view of the outer housing.

The outer housing 12 is a single component, for example, in the form of a rectangular tube made of an insulating material such as synthetic resin. As shown in FIGS. 4 and 5, the outer housing 12 includes a pair of bilaterally symmetrical side wall portions 81, a bottom wall portion 82 coupling the lower end edges of the both left and right side wall portions 81 and an upper wall portion 83 coupling the upper end edges of the both left and right side wall portions 81. The outer housing 12 includes one accommodation chamber 84 for accommodating the inner module 11. The accommodation chamber 84 is provided inside the outer housing 12. Both front and rear ends of the accommodation chamber 84 are open to the outside of the outer housing 12. The inside of the accommodation chamber 84 is not partitioned by partition walls or the like.

As shown in FIG. 4, a first locked portion 81A and a second locked portion 81B are provided on the outer surface (surface opposite to the other side wall portion 81) of each of both left and right side wall portions 81. The first and second locked portions 81A, 81B project outward in the lateral direction (toward the side opposite to the other side wall portion 81). The first locked portion 81A is spaced apart downward from the second locked portion 81B. Locking portions 13E of the retainer 13 to be described later are locked to the first and second locked portions 81A, 81B.

Figure 15:
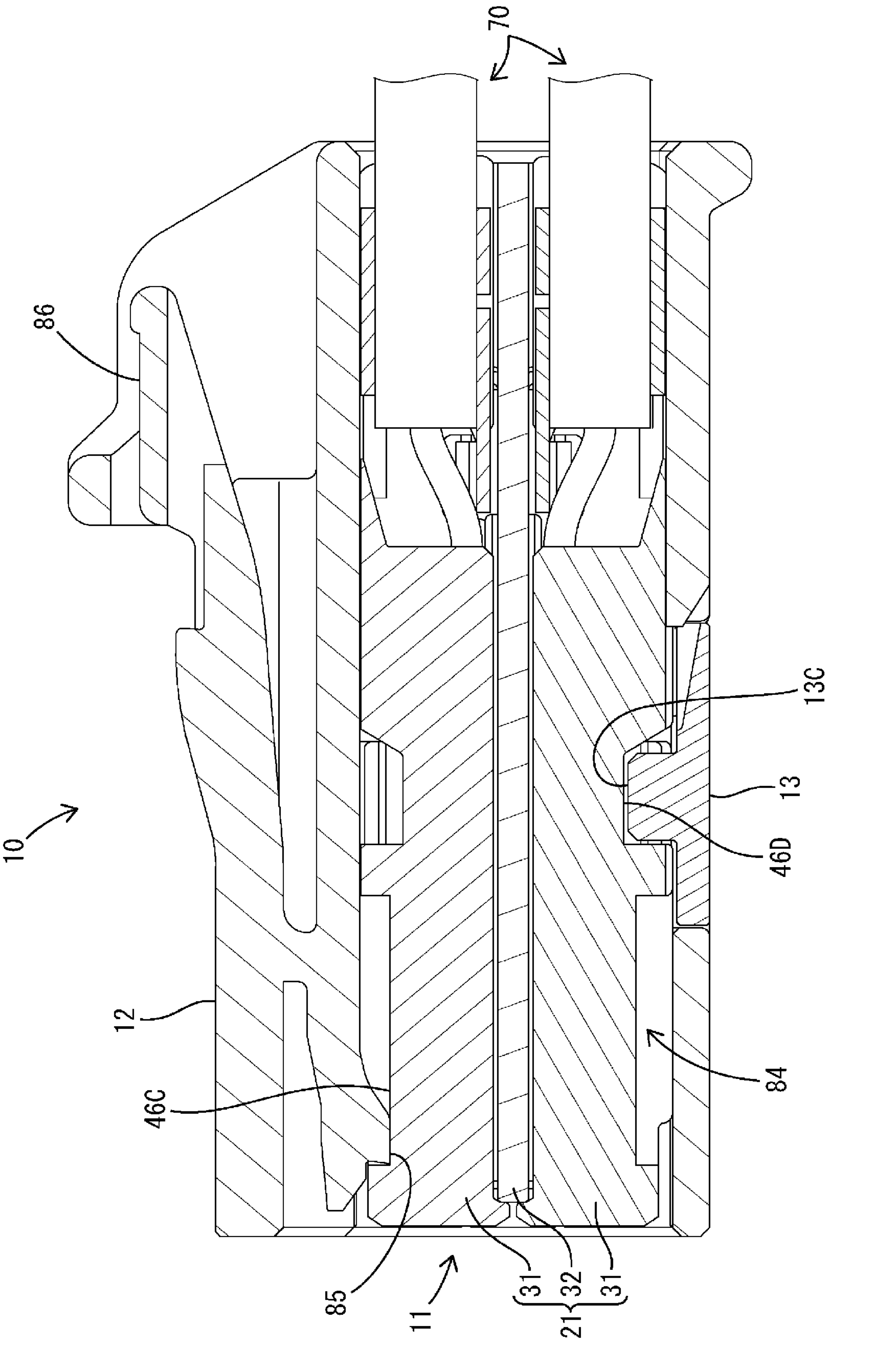
FIG. 15 is a section showing a cross-section of the connector orthogonal to the lateral direction.

As shown in FIGS. 5 and 15, a resilient retaining piece 85 is formed on the inner surface of the upper wall portion 83. The resilient retaining piece 85 is resiliently relatively displaceable in the vertical direction with respect to the upper wall portion 83. The outer housing 12 is formed with a lock arm 86 spaced apart from and covering the outer surface of the upper wall portion 83. The lock arm 86 is cantilevered rearward from a front end part of the outer housing 12 and resiliently deformable.

As shown in FIG. 5, each of lower end parts of the both left and right side wall portions 81 is formed with the groove portion 84A. The groove portion 84A is formed on an inner side (side of the other side wall 81) of a front end part of the side wall portion 81, and elongated in the front-rear direction (inserting direction of the inner module 11). The rear end of the groove portion 84A is open to an outside space behind the outer housing 12. The groove portion 84A is open toward the other side wall portion 81. A front end part of the groove portion 84A is closed and functions as a positioning portion.

As shown in FIG. 5, each of the bottom wall portion 82 and the upper wall portion 83 is provided with a protrusion 84B projecting toward the other wall portion. The protrusion 84B is provided in a lateral center of each of the bottom wall portion 82 and the upper wall portion 83. Ratting preventing portions 84C are provided on both sides of the protrusion 84B in the lateral direction on each of the bottom wall portion 82 and the upper wall portion 83. A pair of rattling preventing portions 84C projecting toward the other side wall portion 81 are provided also on each of the both left and right side wall portions 81.

As shown in FIG. 2, the retainer 13 includes a bottom wall 13A and a pair of side walls 13B. The pair of side walls 13B rise upward from both left and right ends of the bottom wall 13A. A retainer-side protrusion 13C projecting upward is provided on the upper surface of the bottom wall 13A. A retainer-side recess 13D recessed outward (side opposite to the other side wall 13B) is provided in the inner surface (surface on the side of the other side wall 13B) of the side wall 13B. The upper end of the retainer-side recess 13D serves as the locking portion 13E to be caught by the first or second locked portion 81A or 81B. By locking the locking portions 13E to the first locked portions 81A, the retainer 13 is temporarily locked with respect to the outer housing 12. By locking the locking portions 13E to the second locked portions 81B, the retainer 13 is completely locked with respect to the outer housing 12.

(Assembling of Connector)

Figure 6:
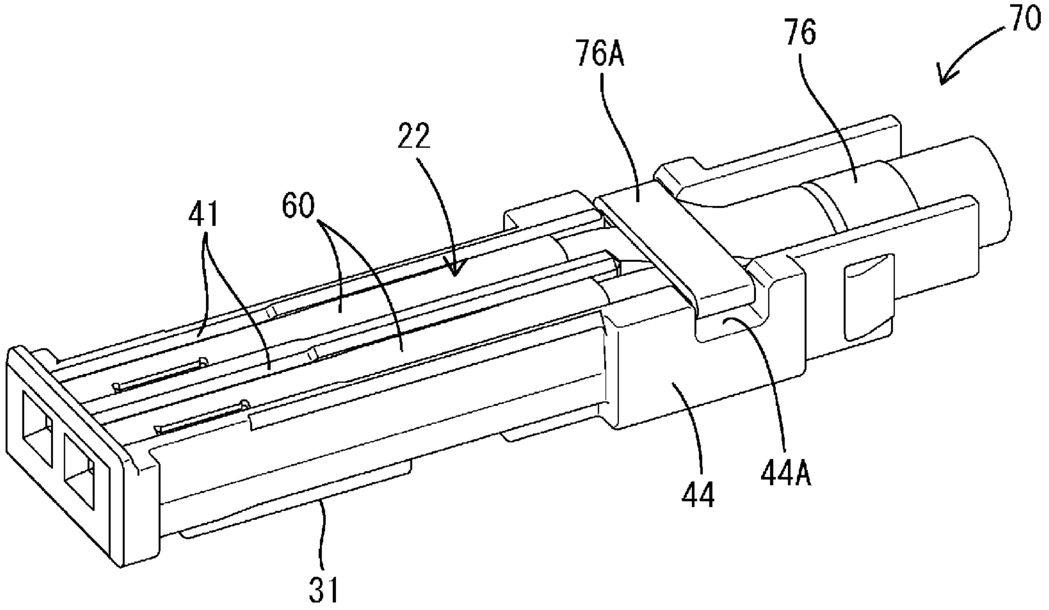
FIG. 6 is a perspective view showing a state where a terminal group is assembled with a first supporting portion.

Next, the assembling of the connector 10 is described. As shown in FIG. 6, the terminal group 22 connected to the cable 70 is assembled with the first supporting portion 31. The terminals 60 are inserted into the openings 41A of the terminal accommodation grooves 41 in a posture (posture shown in FIG. 3) along an extending direction (front-rear direction) of the terminal accommodation grooves 41. Relative displacements of the terminals 60 accommodated into the terminal accommodation grooves 41 in the front-rear direction with respect to the first supporting portion 31 are restricted by the fitting of the front stabilizers 61A and the front retaining recesses 41B and the fitting of the rear stabilizers 61B and the rear retaining recesses 41C. As shown in FIG. 6, the covering portion 76A of the crimp ring 76 enters the recessed portions 44A. The claw portions 41F lock and retain the terminals 60.

Figure 7:
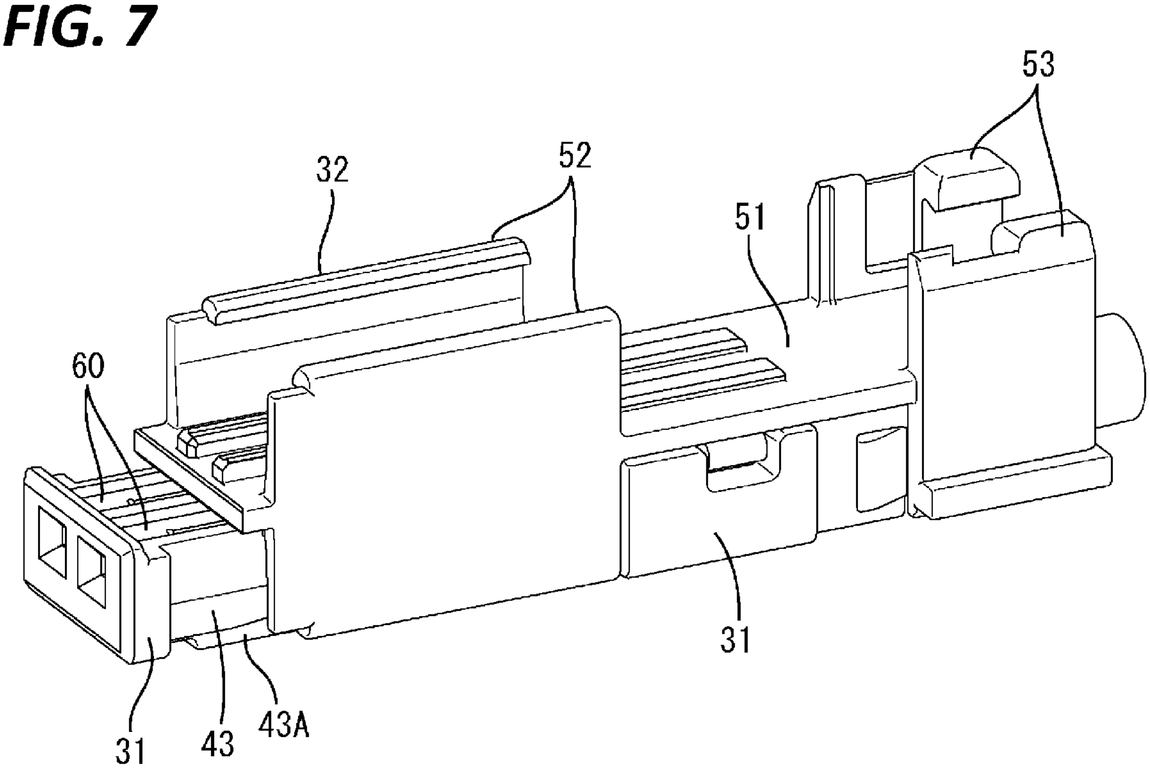
FIG. 7 is a perspective view showing a state where a second supporting portion is fit to a terminal holding position with respect to the first supporting portion of FIG. 6.

Subsequently, as shown in FIG. 7, the second supporting portion 32 is fit to the terminal holding position with respect to the first supporting portion 31 having the terminals 60 assembled therewith. The pair of front side walls 52 of the second supporting portion 32 are fit to rear end sides of the recesses 43 of the first supporting portion 31. The front locking portions 52A of the front side walls 52 are locked to the end grooves 43B (see FIG. 3) and rear end sides of the end grooves 43A.

Figure 8:
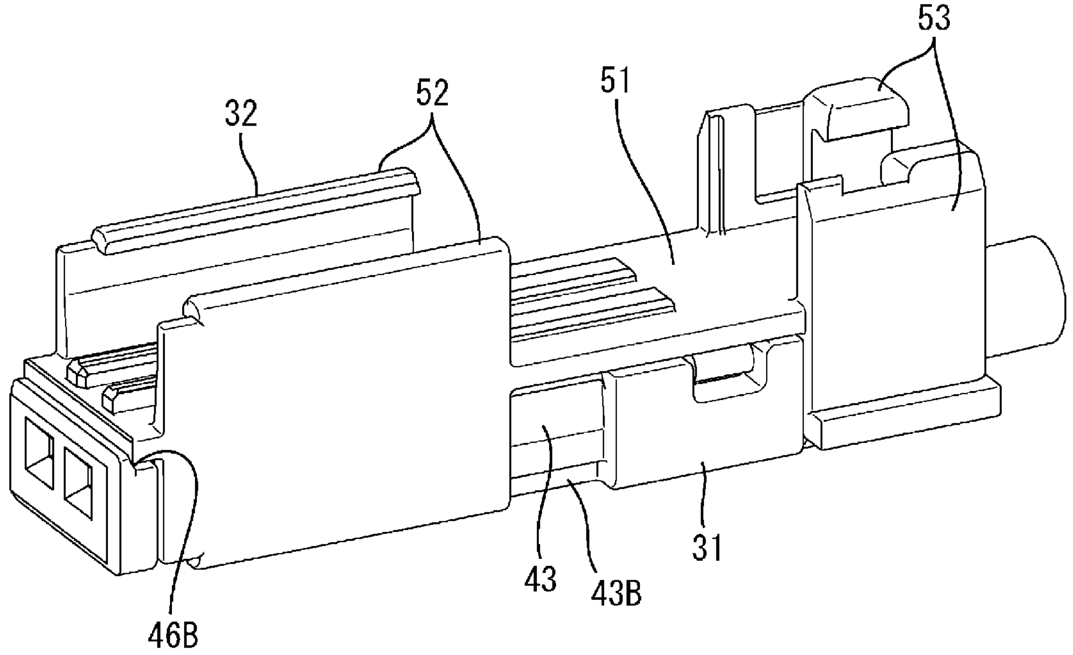
FIG. 8 is a perspective view showing a state where the second supporting portion is slid to a locking position with respect to the first supporting portion in the state of FIG. 7.

Subsequently, as shown in FIG. 8, the second supporting portion 32 is slid forward from the terminal holding position to the locking position with respect to the first supporting portion 31. The pair of front side walls 52 of the second supporting portion 32 are fit to the rear end sides of the recesses 43 of the first supporting portion 31. When parts of the rear side walls 53 in front of and adjacent to the rear groove portions 53A ride over the positioning protrusions 45A of the first supporting portion 31, the pair of extending walls 45 are deflected and deformed inward (toward the other extending walls 45). Since facing each other while being spaced apart in the lateral direction, the pair of extending walls 45 are easily deflected and deformed inward (toward the other extending walls 45). After the parts of the rear side walls 53 in front of and adjacent to the rear groove portions 53A ride over the positioning protrusions 45A, the positioning protrusions 45A of the first supporting portion 31 enter the rear groove portions 53A. As shown in FIG. 10, the rear locking portions 53B of the rear side walls 53 cover vertical end parts of the extending walls 45. As shown in FIG. 8, the front end of the plate portion 51 is fit into the front recess 46B of the first supporting portion 31. The plate portion 51 closes the pair of terminal accommodation grooves 41 of the first supporting portion 31.

Figure 9:
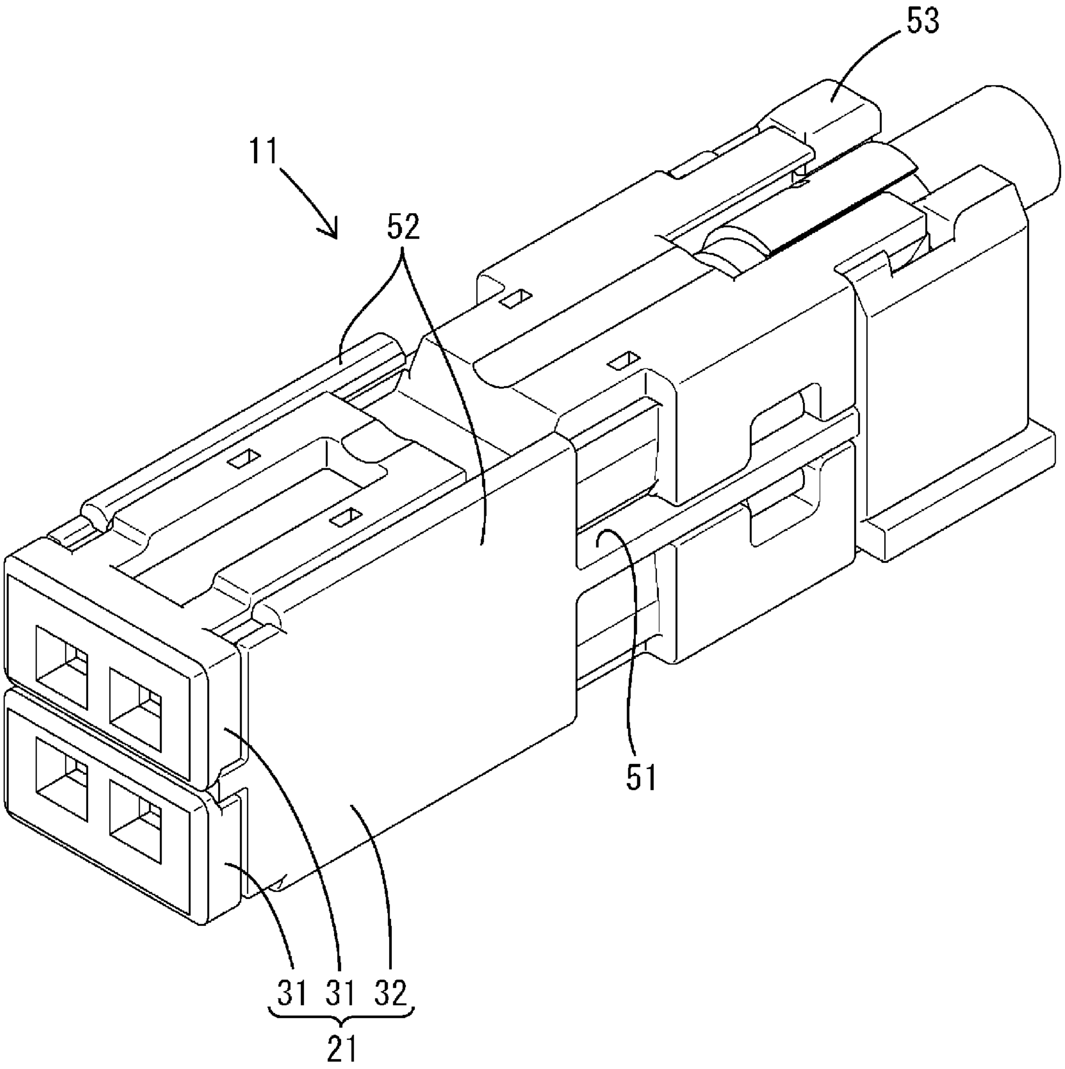
FIG. 9 is a perspective view showing a state where a first supporting portion having a terminal group further mounted therein is assembled with the second supporting portion of FIG. 8.

Subsequently, as shown in FIG. 9, the upper first supporting portion 31 having the terminal group 22 assembled therewith is assembled with the second supporting portion 32 in the same manner as the lower first supporting portion 31 is assembled. The second supporting portion 32 fit to the terminal holding position with respect to the upper first supporting portion 31 is slid to the locking position. As shown in FIG. 11, the openings 41A of two pairs of the terminal accommodation grooves 41 are closed by the plate portion 51.

As shown in FIG. 12, the projecting portion 77 of the cable 70 is exposed to outside from the opening 46A of the first supporting portion 31. A size of the inner module 11 in the vertical direction can be reduced by as much as the cable 70 enters the opening 46A. Since the width L1 (width in the direction orthogonal to the axial direction (front-rear direction) of the sheath 75) of the opening 46A is smaller than the diameter L2 of the sheath 75, the sheath 75 can be prevented from coming out from the opening 46A. The projecting portion 77 enters inside the tapered portion 46F. The outer surface of the sheath 75 can be brought closer to the opening 46A and the size of the inner module 11 can be reduced. In the above way, the inner module 11 is completed.

Figure 13:
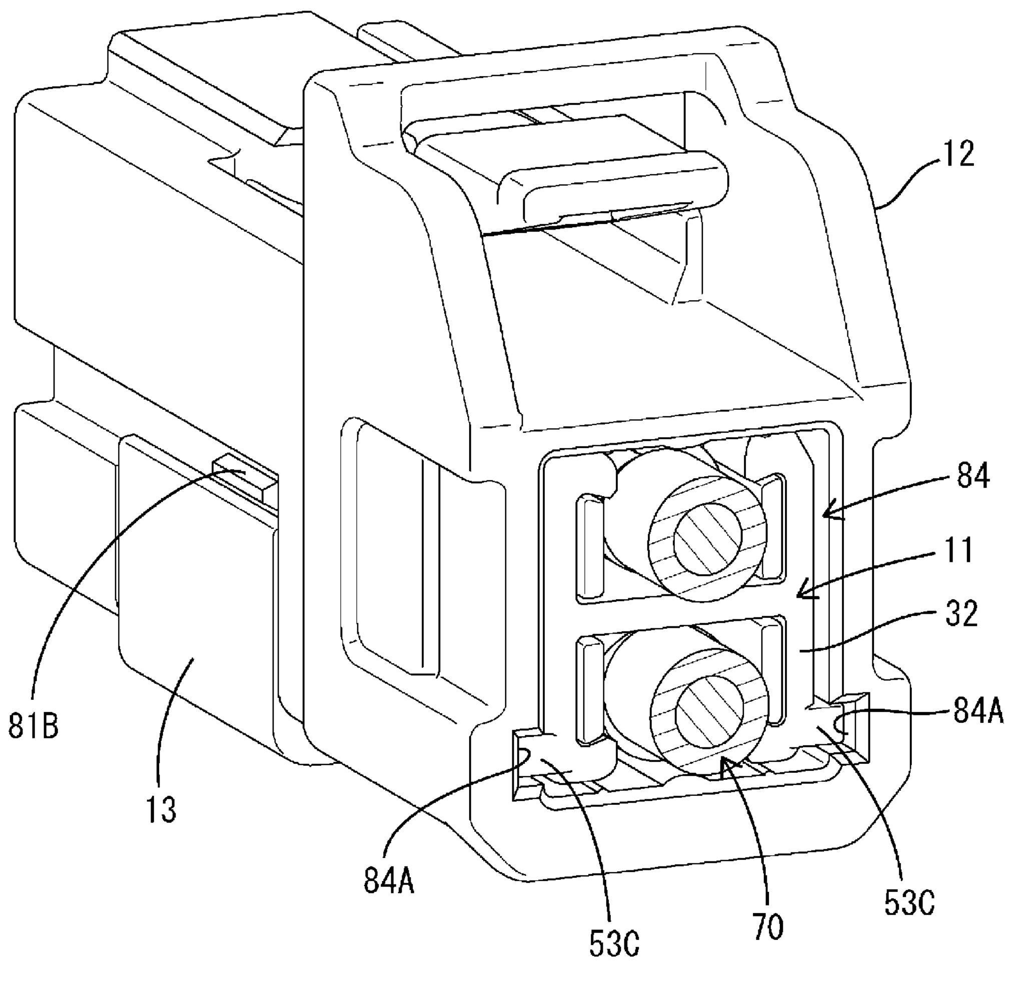
FIG. 13 is a perspective view showing a state where the inner module is inserted in a proper posture in the outer housing when viewed from the back side.
Figure 14:
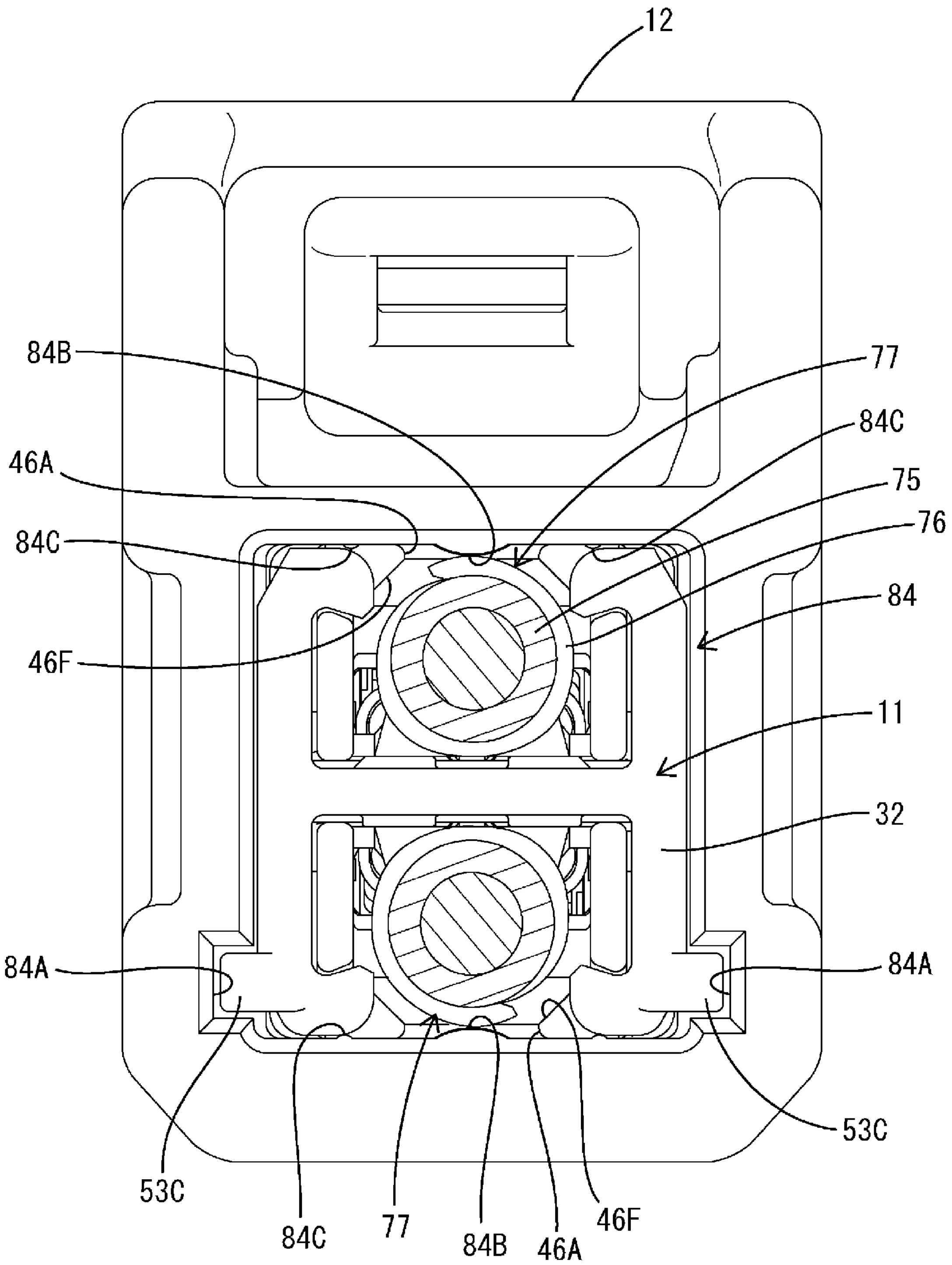
FIG. 14 is a back view of the connector.

Subsequently, as indicated by an arrow of FIG. 2, the inner module 11 is inserted into the accommodation chamber 84 of the outer housing 12 from behind. Before the inner module 11 is inserted, the retainer 13 is temporarily locked to the outer housing 12 (see FIG. 13). FIGS. 13 and 14 show a state where the inner module 11 is inserted in the proper posture in the outer housing 12. The inner module 11 is set in the proper posture by orienting the ribs 53C to correspond to (overlap in the front-rear direction) the groove portions 84A. When the inner module 11 is inserted in the proper posture into the outer housing 12, the ribs 53C enter the groove portions 84A of the outer housing 12. Since the protrusions 84B of the outer housing 12 pass through the long grooves 46E in the front-rear direction if the inner module 11 is set in the proper posture, the outer housing 12 does not interfere with the inner module 11. In an insertion process, the resilient retaining piece 85 is resiliently deformed due to interference with the inner module 11 (front wall of the first supporting portion 31) and resiliently returns to be locked into the first outer recess 45C (primary locking) when the inner module 11 is further inserted thereafter.

As shown in FIG. 14, the protrusions 84B of the outer housing 12 contact the projecting portions 77 of the cables 70 exposed from the openings 46A. The upper protrusion 84B contacts the upper projecting portion 77 from above. The lower protrusions 84B contacts the lower projecting portion 77 from below. A pair of the cables 70 are supported by being sandwiched in the vertical direction by the upper and lower protrusions 84B. Eight rattling preventing portions 84C are in contact with the outer surface of the inner module 11. In FIG. 14, only the upper and lower rattling preventing portions 84C are seen.

After the inner module 11 is inserted in the proper posture into the outer housing 12, the retainer 13 is completely locked to the outer housing 12 as shown in FIG. 15. The retainer-side protrusion 13C is locked into the second outer recess 46D of the first supporting portion 31 (secondary locking). In this way, the inner module 11 is restricted from coming out from the outer housing 12.

Figure 16:
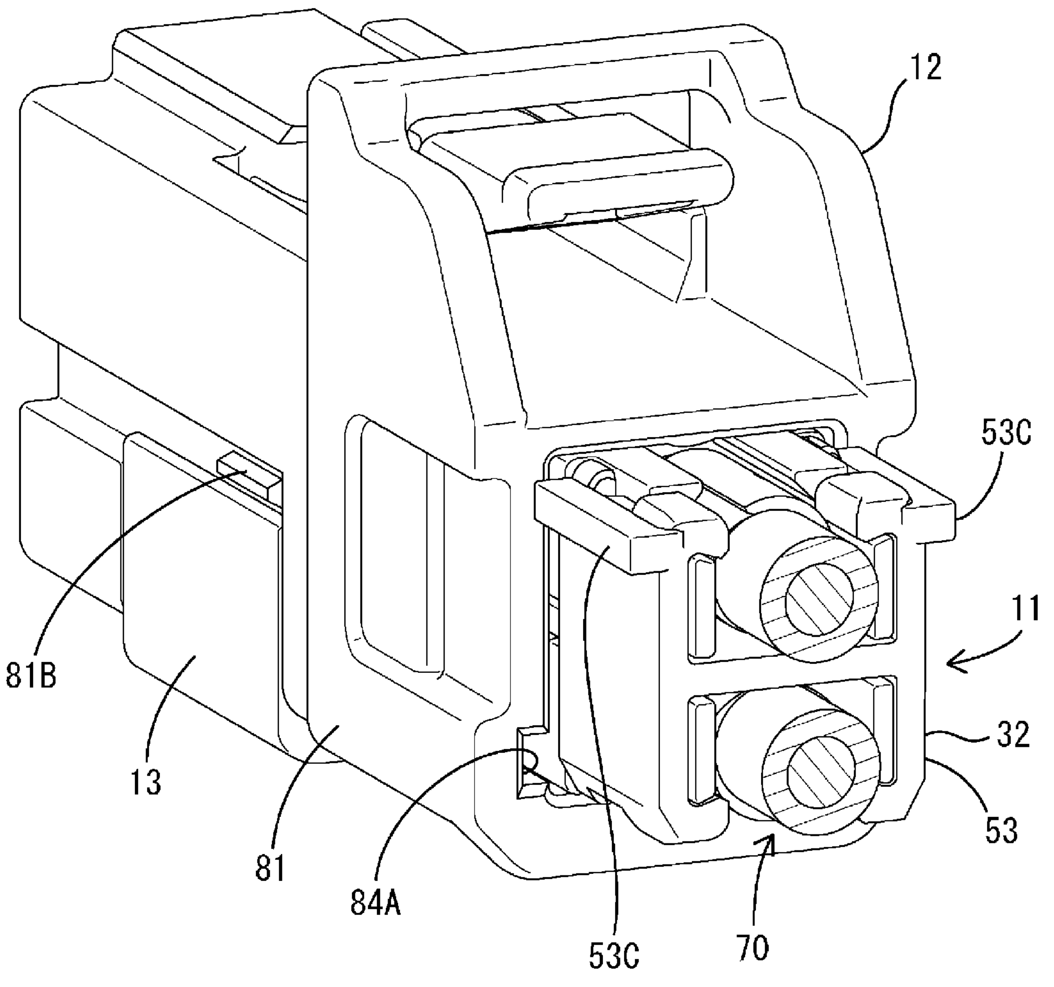
FIG. 16 is a perspective view showing a state where the inner module is inserted in an inverted posture in the outer housing when viewed from the back side.

FIG. 16 shows a state where the inner module 11 is inserted in a vertically inverted posture (inverted posture) in the outer housing 12. When the inner module 11 is inserted in the inverted posture into the outer housing 12, the ribs 53C interfere with the side wall portions 81 of the outer housing 12 as shown in FIG. 16. In this way, it can be detected that the inner module 11 was inserted in the inverted posture into the outer housing 12.

Figure 17:
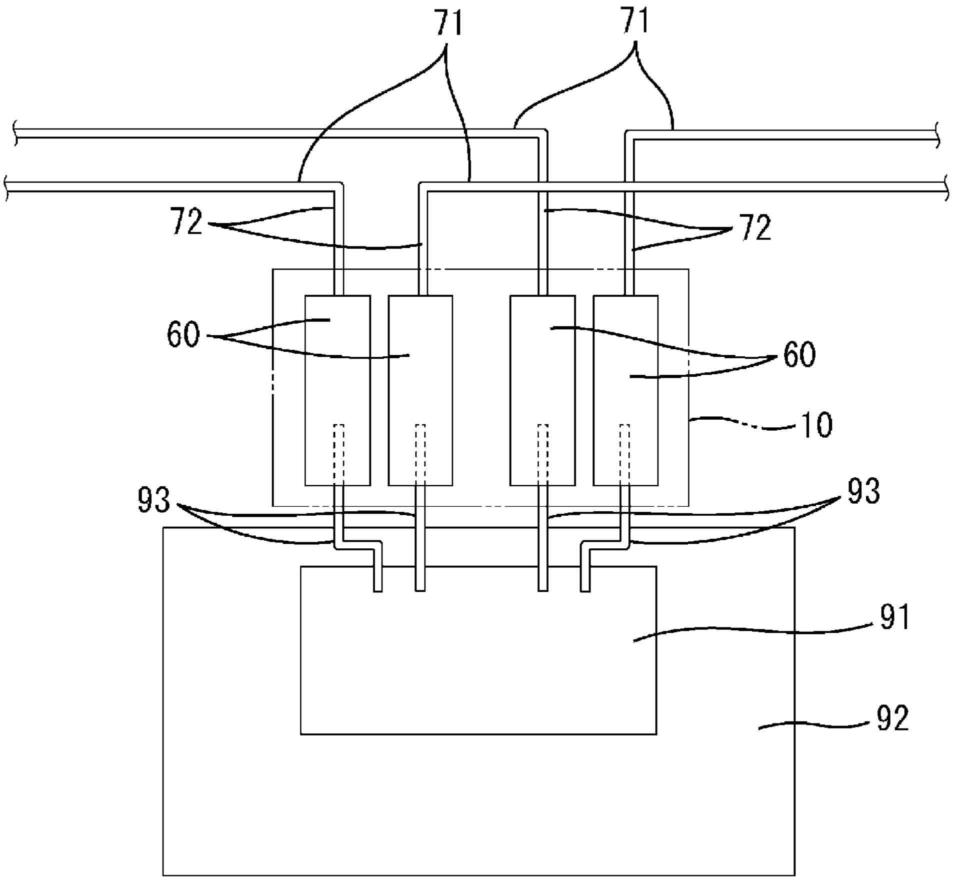
FIG. 17 is a configuration diagram of a branched structure using the connector.

FIG. 17 shows an application example of the connector 10. As shown in FIG. 17, the connector 10 is connected at the intermediate position of the trunk harness constituted by the pair of conductive paths 71. The connector 10 has a function of branching off a communication circuit 91 from the trunk harness. The communication circuit 91 is formed as a printed circuit on a circuit board 92. An unillustrated board connector is mounted on the circuit board 92. The board connector is configured such that two pairs of tab-like branch-side terminals 93 are mounted in an unillustrated board-side housing fixed to the circuit board 92. The branch-side terminals 93 are connected to the communication circuit 91. If the connector 10 is connected to the board connector, the communication circuit 91 is branched off from the trunk harness.

Effects of Embodiment

As described above, since the outer housing 12 is configured to accommodate the inner module 11 including the plurality of terminal groups 22 in one accommodation chamber 84 according to the connector 10 of the present disclosure, it is not necessary to provide partition wall(s) (walls partitioning in an arrangement direction of the plurality of terminal groups 22) for partitioning the space in the accommodation chamber 84 to separately accommodate each of the plurality of terminal groups 22. Thus, a size of the connector 10 in the arrangement direction of the plurality of terminal groups 22 can be reduced.

The pair of terminals 60 of the present disclosure are connected to the twisted pair cable formed by twisting the pair of conductive paths 71. The inner housing 21 includes the pair of first supporting portions 31 including the slit-like openings 41A for accommodating the terminals 60 and the second supporting portion 32 for supporting the first supporting portions 31 to close the openings 41A. According to this, the connector 10 can accommodate the terminals 60 in such a posture parallel to the slit-like openings 41A. Thus, in the connector 10, the untwisting of the twisted pair cable can be made shorter as compared to a configuration in which each of a pair of terminals is inserted in such a posture as to be pierced into the inner housing 21.

The pair of first supporting portions 31 of the present disclosure have the same shape. According to this, the types of constituent components of the connector 10 can be reduced.

In the connector 10 of the present disclosure, the second supporting portion 32 is provided with the plate portion 51 for closing the openings 41A by being sandwiched by the pair of first supporting portions 31. According to this, the openings 41A of the pair of first supporting portions 31 can be respectively closed by one second supporting portion 32. A size of the connector 10 in the plate thickness direction (arrangement direction of the terminal groups 22) of the plate portion 51 can be reduced as compared to a configuration in which each of the openings 41A of the pair of first supporting portions 31 is closed by a separate member.

The outer housing 12 of the present disclosure is provided with the groove portions 84A extending along the inserting direction of the inner module 11. The inner housing 21 is provided with the ribs 53C to be inserted into the groove portions 84A. When the inner module 11 is inserted in the proper posture into the outer housing 12, the ribs 53C enter the groove portions 84A. When the inner module 11 is inserted in a posture different from the proper posture into the outer housing 12, the ribs 53C interfere with the outer housing 12. According to this, since the ribs 53C interfere with the outer housing 12 when the inner module 11 is inserted in a posture different from the proper posture into the outer housing 12, erroneous insertion of the inner module 11 can be detected.

In the connector 10 of the present disclosure, the cable 70 is configured by surrounding the pair of conductive paths 71 by the sheath 75. The cable 70 includes the projecting portion 70 projecting further outwardly of the inner module 11 than the terminals 60. The openings 46A for exposing the projecting portions 77 are provided in the outer surface of the inner module 11. According to this, since the projecting portions 77 are exposed from the openings 46A, the size of the inner module 11 can be reduced by as much as the cables 70 enter the openings 46A as compared to a configuration in which the openings 46A are not provided.

In the connector 10 of the present disclosure, the width of the opening 46A in the direction orthogonal to the axial direction of the sheath 75 is smaller than the diameter of the sheath 75. According to this, the sheath 75 can be prevented from coming out from the opening 46A.

In the connector 10 of the present disclosure, the tapered portion 46F expanded toward the cable 70 is provided on the inner surface of the opening edge of the opening 46A. According to this, the outer surface of the sheath 75 can be brought closer to the opening 46A and the size of the inner module 11 can be reduced as compared to a configuration in which the tapered portion 46F is not provided.

The outer housing 12 of the present disclosure is provided with the protrusions 84B projecting inside the accommodation chamber 84 and to be brought into contact with the projecting portions 77 exposed from the openings 46A. According to this, the connector 10 can prevent the rattling of the cables 70.

Other Embodiments

The present invention is not limited to the above described and illustrated embodiment, but is represented by claims. The present invention is intended to include all changes in the scope of claims and in the meaning and scope of equivalents and include also the following embodiments.

Although the inner module 11 includes the pair of terminal groups 22 in the above embodiment, the inner module 11 may include three or more terminal groups 22. For example, three or more terminal groups 22 may be so arranged in the vertical direction that the openings 41A of the terminal accommodation grooves 41 for the respective terminal groups 22 are oriented in the vertical direction.

Although the first supporting portion 31 is provided with the terminal accommodation grooves 41 long in the front-rear direction in the above embodiment, the first supporting portion 31 may be provided with through holes, into which the terminals 60 are inserted in the front-rear direction.

Although the pair of first supporting portions 31 are supported in postures vertically inverted from each other in the second supporting portion 32, the pair of first supporting portions 31 may be both supported in the same posture (posture not vertically inverted) in the second supporting portion 32. In this case, the second supporting portion 32 may be provided with a configuration for covering the openings 41A of the terminal accommodation grooves 41 facing outward.

Although the pairs of terminals 60 are supported in postures vertically inverted from each other in the inner housing 21 in the above embodiment, the pairs of terminals 60 may be supported in the same posture (posture not vertically inverted) in the inner housing 21.

Although the both rear side walls 53 are provided with the ribs 53C in the above embodiment, only one rear side wall 53 may be provided with the rib 53C. Although the ribs 53C are provided on the rear side walls 53 of the second supporting portion 32, the ribs 53C may be provided on other parts (such as the front side walls 52) of the second supporting portion 32.

Although the tapered portion 46F is provided at the opening 46A of the first supporting portion 31 in the above embodiment, the tapered portion 46F may not be provided.

List of Reference Numerals

| | | |
|---|---|---|
| 10 | . . . | connector |
| 11 | . . . | inner module |
| 12 | . . . | outer housing |
| 13 | . . . | retainer |
| 13A | . . . | bottom wall |
| 13B | . . . | side wall |
| 13C | . . . | retainer-side protrusion |
| 13D | . . . | retainer-side recess |
| 13E | . . . | locking portion |
| 21 | . . . | inner housing |
| 22 | . . . | terminal group |
| 31 | . . . | first supporting portion |
| 32 | . . . | second supporting portion |
| 41 | . . . | terminal accommodation groove |
| 41A | . . . | opening |
| 41B | . . . | front retaining recess |
| 41C | . . . | rear retaining recess |
| 41D | . . . | retaining protrusion |
| 41E | . . . | inclined portion |
| 41F | . . . | claw portion |
| 41G | . . . | narrow portion |
| 42 | . . . | insertion opening |
| 43 | . . . | recess |
| 43A, 43B | . . . | end groove |
| 43C | . . . | wide portion |
| 44 | . . . | thick portion |
| 44A | . . . | recessed portion |
| 45 | . . . | extending wall |
| 45A | . . . | positioning protrusion |
| 46 | . . . | bottom wall portion |
| 46A | . . . | opening |
| 46B | . . . | front recess |
| 46C | . . . | first outer recess |
| 46D | . . . | second outer recess |
| 46E | . . . | long groove |
| 46F | . . . | tapered portion |
| 51 | . . . | plate portion |
| 51A | . . . | projection |
| 52 | . . . | front side wall |
| 52A | . . . | front locking portion |
| 53 | . . . | rear side wall |
| 53A | . . . | rear groove portion |
| 53B | . . . | rear locking portion |
| 53C | . . . | rib |
| 60 | . . . | terminal |
| 61 | . . . | rectangular tube portion |
| 61A | . . . | front stabilizer |
| 61B | . . . | rear stabilizer |
| 62 | . . . | crimping portion |
| 70 | . . . | cable |
| 71 | . . . | conductive path |
| 72 | . . . | divided portion |
| 73 | . . . | insulation coating |
| 74 | . . . | conductor |
| 75 | . . . | sheath |
| 76 | . . . | crimp ring |
| 76A | . . . | covering portion |
| 77 | . . . | projecting portion |
| 81 | . . . | side wall portion |
| 81A | . . . | first locked portion |
| 81B | . . . | second locked portion |
| 82 | . . . | bottom wall portion |
| 83 | . . . | upper wall portion |
| 84 | . . . | accommodation chamber |
| 84A | . . . | groove portion |

-continued

List of Reference Numerals

| | | |
|---|---|---|
| 84B | . . . | protrusion |
| 84C | . . . | rattling preventing portion |
| 85 | . . . | resilient retaining piece |
| 86 | . . . | lock arm |
| 91 | . . . | communication circuit |
| 92 | . . . | circuit board |
| 93 | . . . | branch-side terminal |

What is claimed is:

1. A connector, comprising:

an inner module including a plurality of terminal groups each having a pair of terminals to be respectively connected to a pair of conductive paths;

an outer housing for accommodating the inner module; and a retainer configured to restrict the inner module from coming out from the outer housing, the inner module including an inner housing integrally configured to support the plurality of terminal groups, the outer housing including one accommodation chamber for accommodating the inner module, wherein the inner housing includes:

a pair of first supporting portions having slit-like openings for accommodating the terminals; and a second supporting portion for supporting the first supporting portions, the second supporting portion includes a plate portion for closing the openings by being sandwiched between the first supporting portions, the retainer includes a protrusion to be locked into a recess of one of the first supporting portions, and the one of the first supporting portions is disposed between the plate portion and the protrusion of the retainer.

2. The connector of claim 1, wherein:

the pair of terminals are connected to a twisted pair cable formed by twisting the pair of conductive paths.

3. The connector of claim 1, wherein the plurality of first supporting portions have the same shape.

4. The connector of claim 1, wherein:

the outer housing includes a groove portion extending along an inserting direction of the inner module, the inner housing includes a rib to be inserted into the groove portion, the rib enters the groove portion when the inner module is inserted in a proper posture into the outer housing and the rib interferes with the outer housing when the inner module is inserted in posture different from the proper posture into the outer housing.

5. The connector of claim 1, wherein the first supporting portion includes a positioning protrusion to be engaged with a groove portion of the second supporting portion.

6. A connector, comprising:

an inner module including a plurality of terminal groups each having a pair of terminals to be respectively connected to a pair of conductive paths; and an outer housing for accommodating the inner module, the inner module including an inner housing integrally configured to support the plurality of terminal groups, the outer housing including one accommodation chamber for accommodating the inner module, a cable being configured by surrounding the pair of conductive paths by a sheath, the cable including a projecting portion that includes a crimp ring mounted on the sheath and projects further outwardly of the inner module than the terminals, and an opening for exposing the crimp ring of the projecting portion being provided in an outer surface of the inner housing.

7. The connector of claim 6, wherein a width of the opening in a direction orthogonal to an axial direction of the sheath is smaller than a diameter of the sheath.

8. The connector of claim 6, wherein a tapered portion expanding toward the cable is provided on an inner surface of an opening edge of the opening.

9. The connector of claim 6, wherein the outer housing includes a protrusion projecting inside the accommodation chamber and to be brought into contact with the projecting portion exposed from the opening.

10. The connector of claim 6, wherein the outer housing includes a protrusion projecting inside the accommodation chamber and to be brought into contact with the crimp ring that is exposed from the opening.

* * * * *